United States Patent
Yu et al.

(10) Patent No.: US 11,332,549 B2
(45) Date of Patent: May 17, 2022

(54) METHOD FOR PRODUCING MULTIMODAL POLYOLEFIN USING MULTISTAGE CONTINUOUS POLYMERIZATION PROCESS

(71) Applicant: DL CHEMICAL CO., LTD., Seoul (KR)

(72) Inventors: Seung Tack Yu, Gyeonggi-do (KR); Jung Nam Park, Daejeon (KR); Young Shin Jo, Daejeon (KR); Yong Jae Jun, Daejeon (KR); Byung Keel Sohn, Daejeon (KR); Sung Woo Kang, Daejeon (KR)

(73) Assignee: DL CHEMICAL CO., LTD., Seoul (KR)

( * ) Notice: Subject to any disclaimer, the term of this patent is extended or adjusted under 35 U.S.C. 154(b) by 28 days.

(21) Appl. No.: 16/892,956

(22) Filed: Jun. 4, 2020

(65) Prior Publication Data
US 2020/0385495 A1    Dec. 10, 2020

(30) Foreign Application Priority Data
Jun. 5, 2019    (KR) .................. 10-2019-0066412

(51) Int. Cl.
*C08F 210/02*    (2006.01)
*C08F 2/01*    (2006.01)
(Continued)

(52) U.S. Cl.
CPC ............... *C08F 2/001* (2013.01); *C08F 2/34* (2013.01); *C08F 4/6428* (2013.01);
(Continued)

(58) Field of Classification Search
None
See application file for complete search history.

(56) References Cited

U.S. PATENT DOCUMENTS

| 4,461,873 A | 7/1984 | Bailey et al. |
| 4,530,914 A | 7/1985 | Ewen et al. |

(Continued)

FOREIGN PATENT DOCUMENTS

| EA | 022576 B1 | 1/2016 |
| KR | 10-2006-0063873 A | 6/2006 |

(Continued)

OTHER PUBLICATIONS

Korean Office action dated May 21, 2020 for KR Patent Application No. 10-2019-0066412 and its English translation.
(Continued)

*Primary Examiner* — Richard A Huhn
(74) *Attorney, Agent, or Firm* — Nath, Goldberg & Meyer; Joshua B. Goldberg; Tanya E. Harkins

(57) ABSTRACT

This invention relates to a method for producing multimodal polyolefin using multistage continuous polymerization process for producing multimodal polyolefin having superior melt-strength, moldability, mechanical strength, processability, and appearance. A method for producing multimodal polyolefin using multistage polymerization process, comprising the steps of: polymerizing a high molecular weight bimodal polymer by introducing a monomer in the presence of a catalyst composition including two or more different catalysts in a first reactor; and continuously introducing the high molecular weight bimodal polymer produced in the first reactor into a second reactor, and polymerizing a low molecular weight bimodal polymer by introducing a monomer in the presence of the catalyst composition, wherein the multimodal polyolefin includes the high molecular weight bimodal polymer and the low molecular weight bimodal polymer at the same time.

15 Claims, 2 Drawing Sheets

(51) Int. Cl.
  *C08F 2/00*    (2006.01)
  *C08F 2/34*    (2006.01)
  *C08F 4/642*   (2006.01)
  *C08F 210/06*  (2006.01)

(52) U.S. Cl.
  CPC .......... *C08F 210/02* (2013.01); *C08F 210/06* (2013.01); *C08F 2420/00* (2013.01)

(56) References Cited

U.S. PATENT DOCUMENTS

| | | |
|---|---|---|
| 4,808,561 A | 2/1989 | Welborn, Jr. |
| 4,935,474 A | 6/1990 | Ewen et al. |
| 4,937,299 A | 6/1990 | Ewen et al. |
| 6,841,631 B2 | 1/2005 | Loveday et al. |
| 6,894,128 B2 | 5/2005 | Loveday et al. |
| 6,924,342 B2 * | 8/2005 | Stevens .................. C08L 23/06 526/113 |
| 10,053,522 B2 | 8/2018 | Vantomme et al. |
| 2007/0055021 A1 * | 3/2007 | Chandrashekar ....... C08L 23/04 525/240 |
| 2010/0016526 A1 | 1/2010 | Etherton et al. |

FOREIGN PATENT DOCUMENTS

| | | |
|---|---|---|
| KR | 10-2015-0057974 A | 5/2015 |
| KR | 20160038589 A | 4/2016 |
| KR | 10-1747401 B1 | 6/2017 |
| KR | 10-2018-0043898 A | 5/2018 |
| RU | 2476448 C2 | 2/2013 |
| RU | 2670986 C2 | 10/2018 |
| WO | 9212182 A1 | 7/1992 |
| WO | 2009030647 A1 | 3/2009 |
| WO | 2011080152 A1 | 7/2011 |
| WO | 2011095629 A1 | 8/2011 |
| WO | 2015123177 A1 | 8/2015 |
| WO | 2016023973 A1 | 2/2016 |

OTHER PUBLICATIONS

Extended European Search Report dated Nov. 4, 2020 for European patent application No. 20177697.8.

First Office Action dated Oct. 26, 2020, for Russian Patent Application No. 2020117926.

* cited by examiner

METHOD FOR PRODUCING MULTIMODAL POLYOLEFIN USING MULTISTAGE CONTINUOUS POLYMERIZATION PROCESS

CROSS-REFERENCE TO RELATED APPLICATION

This application claims benefit of priority to Korean Patent Application No. 10-2019-0066412 filed on Jun. 5, 2019, the entire content of which is incorporated herein by reference.

FIELD OF INVENTION

This invention relates to a method for producing multimodal polyolefin using multistage continuous polymerization process, and more particularly to a method for producing multimodal polyolefin using multistage continuous polymerization process, which produces multimodal polyolefin having superior melt-strength, moldability, mechanical strength, processability, and appearance.

BACKGROUND OF INVENTION

In some applications of polyolefin resin, polyolefin resin should have superior toughness, strength, environmental stress resistance, crack resistance, and so on. These properties can be relatively easily improved by increasing molecular weight of polyolefin resin (polymer). However, as the molecular weight increases, the processability of resin deteriorates. To increase the processability, polyolefin resins having different properties are used in combinations. Preferably, polyolefin resin having a single property is used after properly modifying the structure of the polyolefin resin or is used with suitable processing aids. Conventionally, polyethylene resin prepared with Ziegler-Natta catalyst or metallocene catalyst has a narrow molecular weight distribution. When such polyethylene resin is used alone, it is not advantageous in several aspects. Alternatively, a polymer having a broad molecular weight distribution or a multimodal molecular weight distribution is used, properties such as toughness, strength, environmental stress resistance, crack resistance and so on can be improved and at the same time, the processability is also improved. Thus, the polymer having a broad or multimodal molecular weight distribution can overcome the drawbacks of the polyolefin resin having a narrow molecular weight distribution.

Polyolefin having a multimodal molecular weight distribution includes at least two polyolefin components of different molecular weights. For example, the polyolefin includes a high molecular weight polyolefin and a low molecular weight polyolefin in a proper proportion.

Many studies have been conducted for producing a polyolefin having broad molecular weight distribution or multimodal molecular weight distribution. As one of them, a post-reactor process or a melt-blending process is known, in which polyolefins having at least two different molecular weights are blended before or during processing the polyolefin. For example, U.S. Pat. No. 4,461,873 discloses a blending method of physically blending two polymers having different properties for producing a bimodal polymer blend.

However, in case of such physical blending, the produced article is liable to have high gel component, and cannot be used as the applications, such as film, due to the inferior product appearance which results from the high gel component. Further, the physical blending method requires a complete uniform blending of the components, which increases the production cost.

As another method for producing polyolefin having multimodal molecular weight distribution, for example polyolefin having bimodal molecular weight distribution, a method of using a multistage reactor is known. In this method, two or more reactors are used. Specifically, a first polymer component having a first molecular weight distribution is produced in a certain condition in a first reactor, the produced first polymer component is transferred to a second reactor, and then a second polymer component having a second molecular weight distribution which is different from that of the first polymer component, is produced in a different condition from that of the first reactor in the second reactor. This method solves the problems relating to the gel component, but it uses the multistage reactor, so the production efficiency may decrease, or the production cost may increase. Also, when a high molecular weight component is produced in the first reactor, the low molecular weight component cannot be prepared in the second reactor and thus the finally produced polyolefin particles may consist of only the high molecular weight component.

Another method for producing polyolefin having broad molecular weight distribution or multimodal molecular weight distribution is to polymerize polyolefin by using a catalyst mixture in a single reactor. Recently, in the related industry, various attempts have been carried out for producing polyolefin having broad molecular weight distribution or multimodal molecular weight distribution, by using two or more different catalysts in a single reactor. In this method, the resin particles are uniformly mixed in a level of sub-particles, thus the resin components having different molecular weight distributions uniformly exist in a single phase. For example, U.S. Pat. Nos. 4,530,914 and 4,935,474 disclose a method for producing polyolefin having broad molecular weight distribution by polymerizing ethylene or higher alpha-olefins in the presence of a catalyst system comprising two or more metallocenes each having different propagation and termination rate constants and aluminoxane. U.S. Pat. Nos. 6,841,631 and 6,894,128 disclose a method for producing polyethylene having bimodal or multimodal molecular weight distribution by using a metallocene catalyst including at least two metal compounds, and also discloses that the polyethylene can be used for producing film, pipe, blow molded article and so on. The produced polyethylene has a good processability, but the polyethylene components having different molecular weights are not uniformly dispersed in each particle. Thus, even in relatively good processing conditions, the produced article has rough appearance and non-uniform physical properties.

U.S. Pat. No. 4,937,299 discloses a method for producing polyolefin by using a catalyst system comprising at least two kinds of metallocenes each having different reactivity ratio with respect to monomer to be polymerized. U.S. Pat. No. 4,808,561 discloses a method for producing a supported catalyst by reacting metallocene with aluminoxane in the presence of a carrier. The metallocene is supported in the carrier to form a solid powder catalyst. As the carrier, inorganic oxide materials such as silica, alumina, silica-alumina, magnesia, titania, zirconia and the mixtures thereof, and resinous materials such as polyolefin (for example, finely divided polyethylene) are used, and the metallocenes and the aluminoxane are deposited on the dehydrated carrier material.

U.S. Pat. No. 10,053,522 discloses a method for producing polyolefin having bimodal molecular weight distribution by using a single metallocene catalyst and two loop slurry reactors. High density polyethylene (HDPE) having a high molecular weight should include both of super high molecular weight component and low molecular weight component and should be produced with a catalyst which produces polyethylene of sufficiently high molecular weight. However, in the patented method, the super high molecular weight component cannot be produced.

Korean patent No. 10-1747401 discloses a method for producing polyolefin having multimodal molecular weight distribution by using two kinds of metallocene catalysts having different co-monomer reactivities and molecular weights and two continuous stirred tank reactors (CSTR) of hexane slurry phase. In this method, a high-density polyethylene of low molecular weight is produced in a first reactor, and continuously, a low-density polyethylene of high molecular weight is produced in a second reactor. Thereby, in overall, multimodal polyethylene is produced. However, in this method, large amount of hydrogen should be injected into the first reactor, thereby the stabilities of the polymer particles can be deteriorated, and process troubles might easily occur.

SUMMARY OF INVENTION

Therefore, it is an object of the present invention to provide a multimodal polyolefin produced in multistage polymerization process in which a high molecular weight bimodal polymer is produced in a first reactor, and continuously, a low molecular weight bimodal polymer is produced in a second reactor, and the high molecular weight bimodal polymer and the low molecular weight bimodal polymer exist at the same time in polymer particles.

It is other object of the present invention to provide a multimodal polyolefin resin article having the characteristics of a proper range of molecular weight and a broad molecular weight distribution in which polymer chains are uniformly distributed, a super high molecular weight component of molecular weight of more than 5,000,000 g/mol, a high complex viscosity at a low shear rate, and thereby having superior appearance and mechanical strength.

In order to achieve these and other objects, the present invention provides a method for producing multimodal polyolefin using multistage polymerization process, which comprises the steps of polymerizing a high molecular weight bimodal polymer by introducing a monomer in the presence of a catalyst composition including two or more different catalysts in a first reactor; and continuously introducing the high molecular weight bimodal polymer produced in the first reactor into a second reactor, and polymerizing a low molecular weight bimodal polymer by introducing a monomer in the presence of the catalyst composition, wherein the multimodal polyolefin includes the high molecular weight bimodal polymer and the low molecular weight bimodal polymer at the same time.

In the method for producing multimodal polyolefin using multistage continuous polymerization process according to the present invention, the high molecular weight bimodal polymer is produced in the first reactor, and continuously, the low molecular weight bimodal polymer is produced in the second reactor. In the produced multimodal polyolefin, the high molecular weight bimodal polymer and the low molecular weight bimodal polymer exist in the polymer particles at the same time. Thus, the multimodal polyolefin resin has the characteristics of a broad molecular weight distribution, a super high molecular weight component, and a high complex viscosity at a low shear rate.

DETAILED DESCRIPTION OF INVENTION

Figure 1:
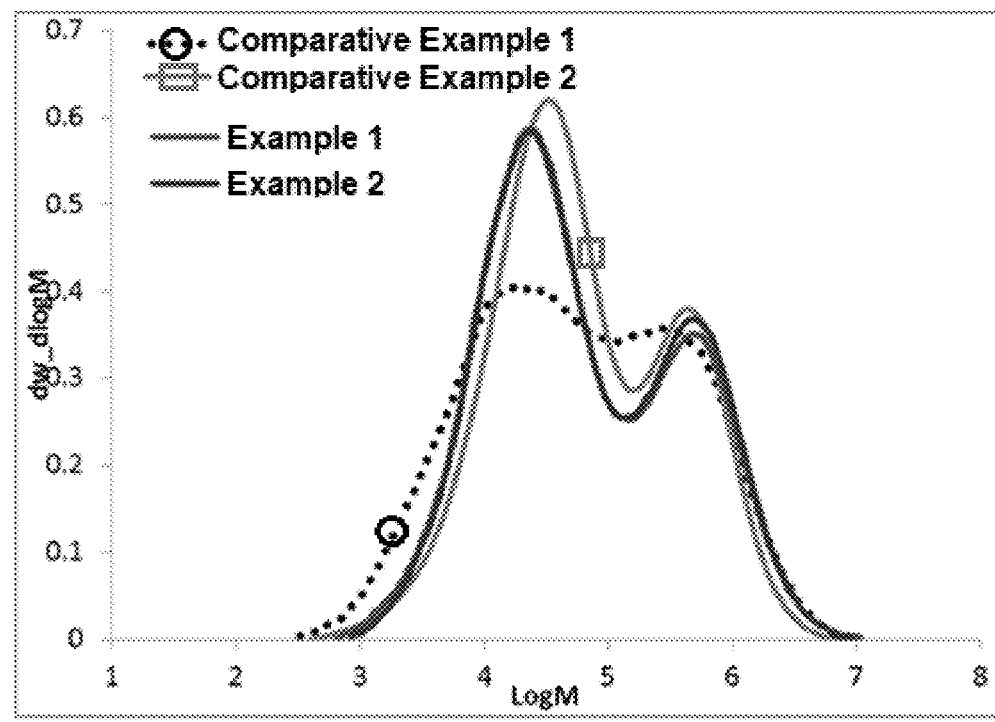
FIG. 1 shows molecular weight distributions by gel-permeation chromatography according to the examples of the present invention and comparative examples.

Hereinafter, the present invention will be explained in more detail. In the detailed description, polyolefin resin can be expressed simply "polymer", "polyolefin", "ethylenic polymer", "olefin polymer", and so on.

The method for producing multimodal polyolefin according to the present invention comprises the steps of polymerizing a high molecular weight bimodal polymer by introducing a monomer in the presence of a catalyst composition including two or more different catalysts in a first reactor; and continuously introducing the high molecular weight bimodal polymer produced in the first reactor into a second reactor, and polymerizing a low molecular weight bimodal polymer by introducing a monomer in the presence of the catalyst composition. The produced multimodal polyolefin includes the high molecular weight bimodal polymer and the low molecular weight bimodal polymer at the same time in polymer particles.

In the present invention, the multimodal polyolefin is produced by sequential polymerization using two or more cascade reactors. The polymerization can be carried out with the first reactor and the second reactor in cascade, and optionally with several additional reactors. The reactors can be conventional reactors and are not limited to specific type or design.

Specifically, by carrying out the polymerization by introducing a monomer (olefin) and two different catalysts in the first reactor with controlling a melt index, a molecular weight, a molecular weight distribution, bimodality and so on, a high molecular weight bimodal polymer can be produced.

By controlling the polymerization temperature in the step, the high molecular weight bimodal polymer having desired physical properties can be produced. Specifically, in the polymerization step of the first reactor, the polymerization temperature is maintained higher than that of other reactor to produce the high molecular weight bimodal polymer.

More specifically, the polymerization temperature at the first reactor is 60 to 110° C., preferably 65 to 100° C., and the pressure at the first reactor atmospheric pressure to 500 kgf/cm$^3$, preferably atmospheric pressure to 60 kgf/cm$^3$, more preferably 10 to 60 kgf/cm$^3$. The polymerization can be carried out in a batch type, a semi-continuous type or a continuous type.

Optionally, hydrogen (H$_2$) is not introduced or introduced in the amount of up to about 200 ppm. Specifically, the hydrogen (H$_2$) concentration in the first reactor is 0 to 1,000 g/ton C2 (ethylene), preferably 0 to 300 g/ton C2.

The produced high molecular weight bimodal polymer satisfies the following properties.

(1) Density (d): 0.930 to 0.965 g/cm$^3$ (2) Melt flow index (MIF, 190° C., 21.6 kg weight condition): 0.01 to 20 g/10 min (3) Weight average molecular weight (Mw) measured with Gel-permeation chromatography (GPC): equal or more than 200,000 g/mol, preferably 200,000 to 2,000,000 g/mol (4) Ratio of weight average molecular weight (Mw) to number average molecular weight (Mn) (Mw/Mn, Molecular weight distribution (MWD)) measured with Gel-permeation chromatography (GPC): 5 to 50

(5) Two or more peaks are shown when molecular weight is measured with Gel-permeation chromatography (GPC)

The high molecular weight bimodal polymer produced in the first reactor is continuously introduced in the second reactor. Thereafter, by carrying out the polymerization by introducing the catalyst which was used for producing the high molecular weight bimodal polymer, large amount of hydrogen (H2) and a monomer (olefin) with controlling a melt index, a molecular weight, a molecular weight distribution, bimodality and so on, the low molecular weight bimodal polymer can be continuously produced. The produced multimodal polyolefin includes the high molecular weight bimodal polymer and the low molecular weight bimodal polymer at the same time in polymer particles.

In the polymerization process, by controlling the concentration (amount) of hydrogen (H2) and polymerization temperature, the molecular weight and molecular weight distribution of the finally produced polymer can be controlled, and the polyolefin having desired properties can be obtained. In the second reactor, the hydrogen can be introduced in the concentration of 100 ppm to 5,000 ppm which is higher than that of the first reactor.

Specifically, the hydrogen ($H_2$) concentration in the second reactor is 100 to 5,000 g/ton C2, preferably 200 to 3,000 g/ton C2, more preferably 300 to 2,000 g/ton C2, polymerization temperature is 60 to 110° C., preferably 65 to 100° C., the pressure of the second reactor is atmospheric pressure to 500 kgf/cm$^3$, preferably atmospheric pressure to 60 kgf/cm$^3$, more preferably 10 to 60 kgf/cm$^3$. The polymerization can be carried out in a batch type, a semi-continuous type or a continuous type.

Preferably, the polymerization temperature of the first reactor is higher than that of the second reactor. At this time, the difference between the polymerization temperatures of the first reactor and the second reactor can be 1 to 20° C. When the temperature difference is out of the range, the multimodal polyolefin resin having desired properties cannot be obtained.

Specifically, in the present invention, at least two reactors and at least two different catalysts are used, and therefore at least 4 peaks corresponding different molecular weights are formed. The activities of the at least two catalysts are different, their activity changes according to temperature are different, and their activity decay rates are also different. To produce multimodal polyolefin having desired properties and processability, preferably, among the two peaks of the polymer produced in the first reactor, the right-side peak is higher than the left-side peak, and also preferably, among the two peaks of the polymer produced in the second reactor, the left-side peak is higher than the right-side peak. To obtain such properties, the temperature of the first reactor is increased to further increase the activity of the catalyst for producing relatively high molecular weight polymer, and the height of the right-side peak increases. In contrast, the temperature of the second reactor is decreased to further decrease the activity of the catalyst for producing relatively high molecular weight polymer, and the height of the right-side peak decreases.

The monomer (olefin) used for producing the polyolefin resin in the first reactor and the second reactor includes linear aliphatic olefin of 2 to 12 carbon atoms, preferably 2 to 10 carbon atoms, cyclic olefin, diene, triene or styrene of 3 to 24 carbon atoms, preferably 3 to 18 carbon atoms, and so on. Example of the linear aliphatic olefin includes ethylene, propylene, 1-butene, 1-pentene, 3-methyl-1-butene, 3-methyl-1-pentene, 4-methyl-1-pentene, 1-hexene, 1-heptene, 1-octene, 1-decene, 1-undecene, 1-dodecene, 1-tetradecene, 1-hexadecene, 1-itocene, 4,4-dimethyl-1-pentene, 4,4-diethyl-1-hexene, 3,4-dimethyl-1-hexene, and so on. Example of the cyclic olefin include cyclopentene, cyclobutene, cyclohexene, 3-methylcyclohexene, cyclooctene, tetracyclodecene, octacyclodecene, dicyclopentadiene, norbornene, 5-methyl-2-norbonene, 5-ethyl-2-norbonene, 5-isobutyl-2-norbonene, 5,6-dimethyl-2-norbonene, 5,5,6-trimethyl-2-norbonene, ethylene norbornene, ethylidene norbornene, Norbornadiene, phenyl norbornene, vinyl norbornene and so on. The preferable diene and triene include a polyene of 4 to 26 carbon atoms having two or three double bonds. Specific example of the diene and the triene includes 1,3-butadiene, 1,4-pentadiene, 1,4-hexadiene, 1,5-hexadiene, 1,9-decadiene, 2-methyl-1,3-butadiene, and so on. Preferable example of the styrene includes styrene or substituted styrene substituted with alkyl group of 1 to 10 carbon atoms, alkoxy group of 1 to 10 carbon atoms, halogen group, amine group, silyl group, halogenated alkyl group or so on. Preferable example of styrene includes styrene, alpha-methyl styrene, divinylbenzene and 3-chloromethylstyrene. The olefin monomers can be polymerized to form a homo-polymer, an alternating copolymer, a random copolymer or a block copolymer.

The polyolefin resin of the present invention can be composed of a main component and an auxiliary component as a remainder. The main component is derived from one or more monomer selected from the group consisting of ethylene, propylene and mixture thereof. The auxiliary component can be derived from one or more monomer selected from α-olefins of 4 to 10 carbon atoms, for example 6 to 8 carbon atoms. The amount of the auxiliary component is preferably 0.01 to 10.0 weight %, more preferably 0.01 to 3.0 weight % with respect to the total polymer of 100 weight %.

In order to produce the low molecular weight bimodal polymer, one or more comonomer (α-olefin) can be introduced into the second reactor. Example of the comonomer includes α-olefin of 2 to 20 carbon atoms, preferably 4 to 10 carbon atoms such as propylene, 1-butene, 1-pentene, 4-methyl-1-pentene, 1-hexene, 1-octene, 1-decene, 1-dodecen, 1-tetradecene, 3-methyl-1-butene, 3-methyl-1-pentene, and so on. The amount of the comonomer is 0 to 30.0 weight %, preferably 0.01 to 30.0 weight %, for example, 0 to 20 weight % with respect to the total polymer of 100 weight %.

The produced low molecular weight bimodal polymer satisfies the following properties.

(6) Density (d): 0.910 to 0.965 g/cm$^3$ (7) Melt flow index (MIF, 190° C., 21.6 kg weight condition): 10 to 200 g/10 min (8) Weight average molecular weight (Mw) measured with Gel-permeation chromatography (GPC): less than 200,000 g/mol, preferably 30,000 to 199,000 g/mol (9) Ratio of weight average molecular weight (Mw) to number average molecular weight (Mn) (Mw/Mn, Molecular weight distribution (MWD)) measured with Gel-permeation chromatography (GPC): 5 to 50

(10) Two or more peaks are shown when molecular weight is measured with Gel-permeation chromatography (GPC)

The multistage polymerization method according to the present invention is carried out by two or more steps of different reaction conditions. Both of the two or more reactions can be a slurry phase reaction or a gas phase reaction, or the two or more reactions can be different reactions. The first reactor and the second reactor may include a slurry phase reactor and a gas phase reactor. For example, the first reactor is a slurry phase reactor, and the second reactor is a gas phase reactor. On the contrary, the first reactor is a gas phase reactor, and the second reactor is a slurry phase reactor.

When the polymerization in the reactors is carried out in a slurry phase, a solvent or olefin itself may work as a reaction medium. Example of the solvent includes propane, butane, pentane, hexane, octane, decane, dodecane, cyclopentane, methylcyclopentane, cyclohexane, benzene, toluene, xylene, dichloromethane, chloroethane, 1,2-dichloroethane, chlorobenzene, and so on, and, if necessary, mixtures of the solvents can be used. When the polymerization in the reactors is carried out in a gas phase, inert gas can be used, and example of the inert gas includes nitrogen, ethane, propane and so on.

The catalyst composition for producing multimodal polyolefin according to the present invention can be used for both of the two or more reactors and includes two or more metallocene catalysts for producing polymers of different molecular weights and one or more cocatalyst. Specifically, the catalyst composition is for polymerizing multimodal polyolefin for forming film, pipe and so on and having broad molecular weight distribution or bimodal molecular weight distribution. The catalyst composition includes (i) one or more first metallocene compound of the following Chemical formula 1 for producing relatively low molecular weight polymer, (ii) one or more second metallocene compound of the following Chemical formula 2 for producing relatively high molecular weight polymer, and (iii) one or more cocatalyst selected from the aluminoxanes of the following Chemical formula 3, 4 and 5.

(L1)(L2)(X1)(X2)M1  [Chemical formula 1]

In Chemical formula 1, M1 is Titanium (Ti), Zirconium (Zr) or Hafnium (Hf); (L1) and (L2) are independently, a hydrocarbon substituents (hydrocarbyl group) of 3 to 10 carbon atoms in which at least one secondary or tertiary carbon is contained, preferably a cyclopentadienyl group having alkyl group; (X1) and (X2) are independently F, Cl, Br, I or a hydrocarbyl group of 1 to 10 carbon atoms. Here, (L1) and (L2) each is different to each other, and may be a cyclopentadienyl group having a hydrocarbyl group (preferably, alkyl group) of 3 to 10 carbon atoms, which contains at least one secondary or tertiary carbon, but does not contain aryl group. (L1) and (L2) are the same, and may be a cyclopentadienyl group having a hydrocarbyl group (preferably, alkyl group) of 3 to 10 carbon atoms, which contains at least one secondary or tertiary carbon, but does not contain aryl group. Here, the secondary or tertiary carbon contained in the hydrocarbyl group is a part for showing steric hindrance. As required, the cyclopentadienyl group may be substituted by 1 to 10 hydrocarbyl groups (substituent) of 1 to 4 carbon atoms, besides a substituent group showing the steric hindrance effect. The adjoining substituent groups are connected to each other to form a ring structure. For example, two hydrocarbyl groups which are substituted in the cyclopentadienyl group are connected to each other to in whole form an indenyl group (see: following Chemical Formula 1h) or form a cyclohexane ring structure (see: following Chemical Formula 1i).

(L3-Q-L4)(X1)(X2)M2  [Chemical formula 2]

In Chemical formula 2, M2 is Titanium (Ti), Zirconium (Zr) or Hafnium (Hf); (L3) is a fluorenyl group having two or more, preferably two, hydrocarbyl substituent groups of 4 to 10 carbon atoms containing the tertiary carbon; (L4) is a cyclopentadienyl group having at least one hydrocarbyl substituent groups of 4 to 10 carbon atoms, preferably, a cyclopentadienyl group which does not contain aryl group and has at least one hydrocarbyl substituent groups of 4 to 10 carbon atoms, more preferably a cyclopentadienyl group which does not contain aryl group and has at least one hydrocarbyl substituent groups of 4 to 7 carbon atoms; (Q) is a crosslinking functional group represented by Chemical formula Q1R1R2, Q1 is carbon atom (C), silicon atom (Si) or germanium atom (Ge), R1 and R2 are independently hydrogen atom or hydrocarbyl group of 1 to 10 carbon atoms, for example, alkyl group or aryl group, preferably R1 and R2 are the same to each other, and aryl group of 6 to 10 carbon atoms; (X1) and (X2) are independently F, Cl, Br, I or hydrocarbyl group of 1 to 10 carbon atoms. Here, the tertiary carbon contained in the hydrocarbyl group is a part for showing the steric hindrance effect.

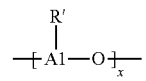  [Chemical formula 3]

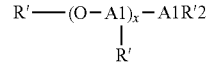  [Chemical formula 4]

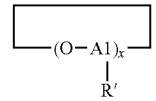  [Chemical formula 5]

In Chemical Formulas 3, 4 and 5, R' is hydrocarbyl group, preferably linear or branched alkyl group of 1 to 10 carbon atoms, and it is more preferably that most of R' is methyl group, x is an integer of 1 to 70, preferably 1 to 50, more preferably 10 to 40 and y is an integer of 3 to 50, preferably 10 to 40.

In the catalyst composition for polymerizing olefin used the present invention, (i) the first metallocene compound has a substituent containing the secondary and tertiary carbon which show steric hindrance effect, and is a catalyst for forming low molecular weight polyolefin which is not branched, and (ii) the second metallocene compound has superior polymerization activity, contains cyclopentadienyl group having a hydrocarbyl substituent groups of 4 to 10 carbon atoms which is effective in reducing LCB (Long Chain Branch) and bridged fluorenyl group, and is a catalyst for forming high molecular weight polyolefin.

Hereinafter, the first metallocene compound represented by the Chemical formula 1 will be detail explained. Polymerization of multimodal or bimodal polyolefin requires a catalyst for preparing polymer of relatively low molecular weight and thus for this, the first metallocene compound is used. When the density of polymer of low molecular weight polymerized with the first metallocene compound is higher, that is, the mount of comonomer in the polymer is less, an extrusion load during molding of the polymer is reduced, productivity is excellent due to the large amount of extrusion, and when molded into a pipe shape, the impact strength and long-term internal water pressure properties are improved. The first metallocene compound includes ligand (ligand showing steric hindrance effect) having a hydrocarbyl substituent group in which at least one secondary or tertiary carbon is contained. In case of contacting with comonomer, through steric hindrance, it inhibits the comonomer from being coordinated to the central metal, thereby increasing the density of the low molecular weight polymer. The preferable example of the first metallocene compound represented by Chemical formula 1 include compounds represented by following Chemical formula 1a to Chemical formula 1l.

[Chemical formula 1a]

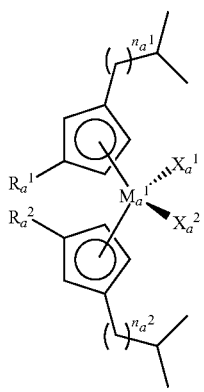

In Chemical formula 1a, Ma1 is Titanium (Ti), Zirconium (Zr) or Hafnium (Hf), Ra1 and Ra2 are independently hydrogen or a hydrocarbyl group of 1 to 10 carbon atoms, Xa1 and Xa2 are independently F, Cl, Br, I or a hydrocarbyl group of 1 to 10 carbon atoms, na1 and na2 are independently an integer of 0 to 7.

[Chemical formula 1b]

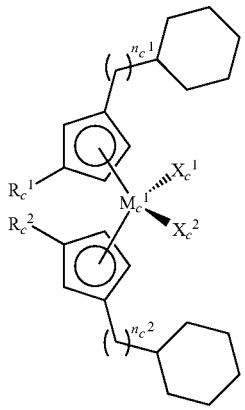

In Chemical formula 1 b, Mb1 is Titanium (Ti), Zirconium (Zr) or Hafnium (Hf), Rb1 and Rb2 are independently hydrogen or a hydrocarbyl group of 1 to 10 carbon atoms, Xb1 and Xb2 are independently F, Cl, Br, I or a hydrocarbyl group of 1 to 10 carbon atoms, nb1 and nb2 are independently an integer of 0 to 6.

[Chemical formula 1c]

In Chemical formula 1c, Mc1 is Titanium (Ti), Zirconium (Zr) or Hafnium (Hf), Rc1 and Rc2 are independently hydrogen or a hydrocarbyl group of 1 to 10 carbon atoms, Xc1 and Xc2 are independently F, Cl, Br, I or a hydrocarbyl group of 1 to 10 carbon atoms, nc1 and nc2 are independently an integer of 0 to 4.

[Chemical formula 1d]

In Chemical formula 1d, Md1 is Titanium (Ti), Zirconium (Zr) or Hafnium (Hf), Rd1 and Rd2 are independently hydrogen or a hydrocarbyl group of 1 to 10 carbon atoms, Xd1 and Xd2 are independently F, Cl, Br, I or a hydrocarbyl group of 1 to 10 carbon atoms, nd1 and nd2 are independently an integer of 0 to 4.

[Chemical formula 1e]

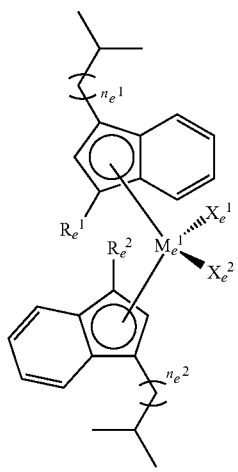

In Chemical formula 1e, Me1 is Titanium (Ti), Zirconium (Zr) or Hafnium (Hf), Re1 and Re2 are independently hydrogen or a hydrocarbyl group of 1 to 10 carbon atoms, Xe1 and Xe2 are independently F, Cl, Br, I or a hydrocarbyl group of 1 to 10 carbon atoms, ne1 and ne2 are independently an integer of 0 to 7.

[Chemical formula 1g]

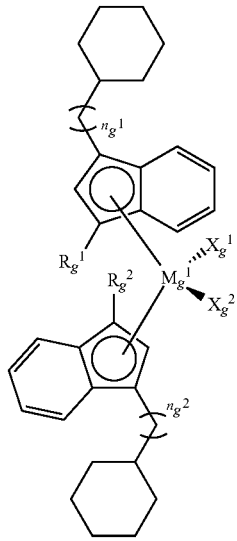

In Chemical formula 1g, Mg1 is Titanium (Ti), Zirconium (Zr) or Hafnium (Hf), Rg1 and Rg2 are independently hydrogen or a hydrocarbyl group of 1 to 10 carbon atoms, Xg1 and Xg2 are independently F, Cl, Br, I or a hydrocarbyl group of 1 to 10 carbon atoms, ng1 and ng2 are independently an integer of 0 to 4.

[Chemical formula 1f]

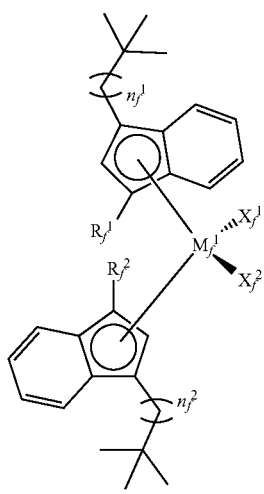

In Chemical formula 1e, Mf1 is Titanium (Ti), Zirconium (Zr) or Hafnium (Hf), Rf1 and Rf2 are independently hydrogen or a hydrocarbyl group of 1 to 10 carbon atoms, Xf1 and Xf2 are independently F, Cl, Br, I or a hydrocarbyl group of 1 to 10 carbon atoms, nf1 and nf2 are independently an integer of 0 to 6.

[Chemical formula 1h]

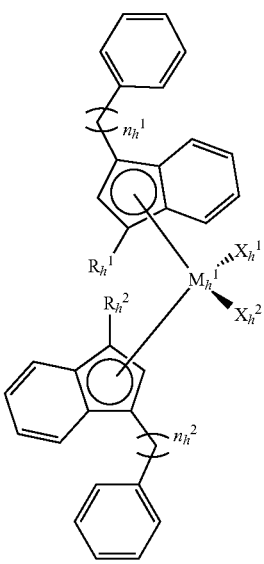

In Chemical formula 1 h, Mh1 is Titanium (Ti), Zirconium (Zr) or Hafnium (Hf), Rh1 and Rh2 are independently hydrogen or a hydrocarbyl group of 1 to 10 carbon atoms, Xh1 and Xh2 are independently F, Cl, Br, I or a hydrocarbyl group of 1 to 10 carbon atoms, nh1 and nh2 are independently an integer of 0 to 4.

[Chemical formula 1i]

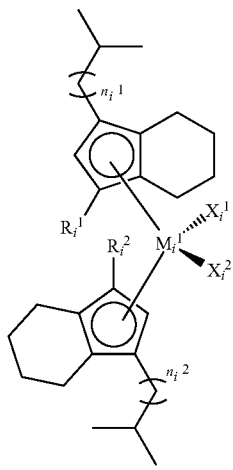

In Chemical formula 1i, Mi1 is Titanium (Ti), Zirconium (Zr) or Hafnium (Hf), Ri1 and Ri2 are independently hydrogen or a hydrocarbyl group of 1 to 10 carbon atoms, Xi1 and Xi2 are independently F, Cl, Br, I or a hydrocarbyl group of 1 to 10 carbon atoms, ni1 and ni2 are independently an integer of 0 to 7.

[Chemical formula 1j]

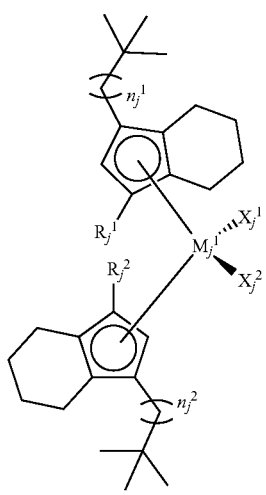

In Chemical formula 1j, Mj1 is Titanium (Ti), Zirconium (Zr) or Hafnium (Hf), Rj1 and Rj2 are independently hydrogen or a hydrocarbyl group of 1 to 10 carbon atoms, Xj1 and Xj2 are independently F, Cl, Br, I or a hydrocarbyl group of 1 to 10 carbon atoms, nj1 and nj2 are independently an integer of 0 to 6.

[Chemical formula 1k]

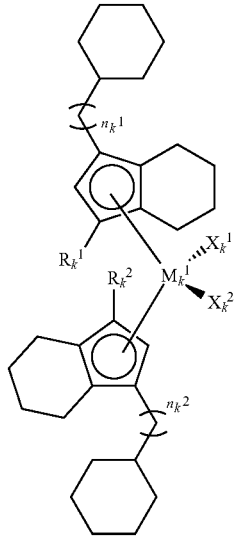

In Chemical formula 1k, Mk1 is Titanium (Ti), Zirconium (Zr) or Hafnium (Hf), Rk1 and Rk2 are independently hydrogen or a hydrocarbyl group of 1 to 10 carbon atoms, Xk1 and Xk2 are independently F, Cl, Br, I or a hydrocarbyl group of 1 to 10 carbon atoms, nk1 and nk2 are independently an integer of 0 to 4.

[Chemical formula 1l]

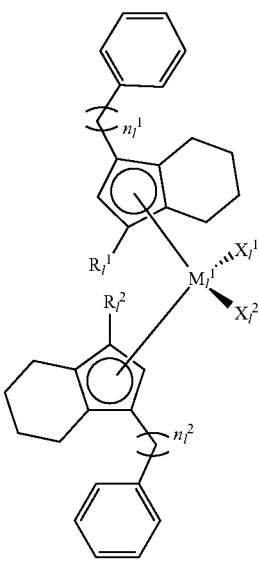

In Chemical formula 1l, Ml1 is Titanium (Ti), Zirconium (Zr) or Hafnium (Hf), Rl1 and Rl2 are independently hydrogen or a hydrocarbyl group of 1 to 10 carbon atoms, Xl1 and Xl2 are independently F, Cl, Br, I or a hydrocarbyl group of 1 to 10 carbon atoms, nl1 and nl2 are independently an integer of 0 to 4.

The second metallocene compound of Chemical formula 2 will be explained in detail. For polymerizing multimodal or bimodal polyolefin, a catalyst for producing relatively high molecular weight polymer is necessary, and the second metallocene compound is used for this purpose. As the density of the high molecular weight polymer produced with the second metallocene compound becomes reduced, namely, as the amount of comonomer increases, an impact strength and a long-term hydrostatic pressure endurance property of the polyolefin article can be improved due to ties of SCBs (Short Chain Branches) in molecular chains. In contrast, as LCBs (Long Chain Branches) in molecular chains of the high molecular weight polymer (component) increase, flexible parts are non-uniformly produced in the molecular chains, thereby the long-term hydrostatic pressure endurance property is deteriorated.

The second metallocene compound has (i) a fluorenyl group having two or more hydrocarbyl substituents of 4 to 10 carbon atoms including a tertiary carbon and (ii) a cyclopentadienyl group having one or more hydrocarbyl substituents of 4 to 10 carbon atoms, wherein the two ligands are bridged. The second metallocene compound prevents the LCBs of long molecular chains being coordinated to the center metal by steric hinderance when the second metallocene compound contacts comonomers during the polymerization of olefin. Thus, the second metallocene compound suppresses the introduction of LCBs and increases the amount of SCBs in the high molecular weight component of the polymer. More specifically, the activity and molecular weight of the polymer can be controlled according to the type of substituent attached to the cyclopentadienyl group of the second metallocene compound. The second metallocene compound having a hydrocarbyl group of at least 4 carbon atoms is effectively used in combination with the first metallocene compound (See Examples below). Even more specifically, substituents having steric hindrance effect are attached to the fluorenyl group. However, as the ligands are bridged, the reaction spaces for monomers becomes wider, and the introduction of LCBs is not sufficiently suppressed. Therefore, to further suppress the introduction of LCBs, the second metallocene compound is designed so that a hydrocarbyl group of at least 4 carbon atoms is attached to the cyclopentadienyl group. Since the second metallocene compound of Chemical formula 2 has ligands having the steric hindrance effect, the second metallocene compound suppresses the introduction of LCBs in the polyolefin molecular chains but does not suppress the introduction of relatively small SCBs. Compared with the first metallocene compound, the second metallocene compound produces high molecular weight polymer having different activity and molecular weight.

The preferable example of the second metallocene compound represented by Chemical formula 2 include compounds represented by following Chemical formula 2a to Chemical formula 2c.

[Chemical formula 2a]

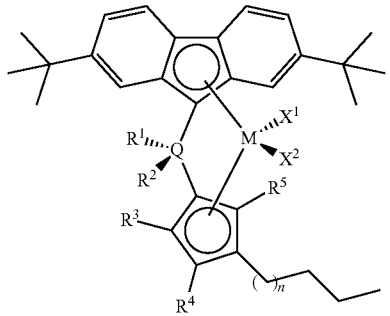

[Chemical formula 2b]

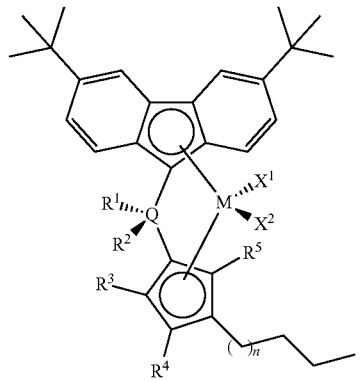

[Chemical formula 2c]

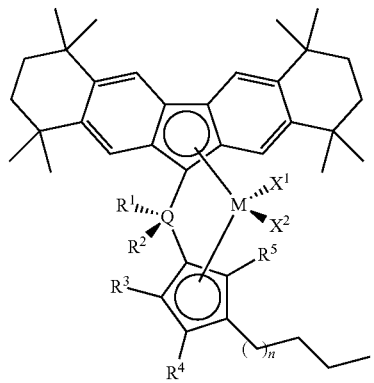

In Chemical formula 2a to Chemical formula 2c, M is Titanium (Ti), Zirconium (Zr) or Hafnium (Hf); R1 and R2 are independently hydrogen or a hydrocarbyl group of 1 to 10 carbon atoms; R3, R4 and R5 are independently hydrogen or a hydrocarbyl group of 1 to 10 carbon atoms; Q is carbon atom, silicon atom or germanium atom; X1 and X2 are independently F, Cl, Br, I or a hydrocarbyl group of 1 to 10 carbon atoms; n is an integer of 1 to 7.

In the catalyst composition for olefin polymerization according to the present invention, the use amount of the second metallocene compound represented by Chemical formula 2 is 0.01 to 100 moles, preferably 0.1 to 20 moles, more preferably 1 to 10 moles, with respect to 1 mole of the first metallocene compound represented by Chemical formula 1. Here, when the amount of the metallocene compound represented by Chemical formula 1 is too little with respect to the amount of the second metallocene compound, it is worried that prepared polymer becomes mainly high molecular weight polymer, and when the amount of the metallocene compound represented by Chemical formula 1 is too much with respect to the amount of the second metallocene compound, it is worried that prepared polymer becomes mainly low molecular weight polymer.

The aluminoxane represented by Chemical Formulas 3, 4, and 5 used in the catalyst composition according to the present invention is for activating catalyst component and scavenging impurities, and may have a linear, cyclic, or network structure, and, for example, a linear aluminoxane can be represented by the following Formula 4, and a cyclic aluminoxane can be represented by the following Formula 5. In the present invention, as the aluminoxane, an alkyl aluminoxane which is commercially available can be used.

The non-limiting examples of the alkyl aluminoxane include methylaluminoxane, ethylaluminoxane, butylaluminoxane, isobutylaluminoxane, hexylaluminoxane, octylaluminoxane, decylaluminoxane, and so on. The aluminoxane is also commercially available in various forms of hydrocarbon solutions. Preferable aluminoxane is an aromatic hydrocarbon solution of aluminoxane, and more preferable aluminoxane is an aluminoxane dissolved in toluene. In the present invention, a single aluminoxane or mixtures of more than one aluminoxane can be used. The alkyl aluminoxane can be prepared by various conventional methods such as adding proper amount of water to trialkylaluminum, or reacting a hydrocarbyl compound having water or an inorganic hydrated salt with trialkylaluminum. Conventionally, a mixture of linear aluminoxane and cyclic aluminoxane is obtained.

In the catalyst composition according to the present invention, the amount of the aluminoxane is 1 to 100,000 mole, preferably, 1 to 5,000 mole, more preferably 1 to 2,500 mole, most preferably 1 to 1,000 mole with respect to 1 mole of sum of the first metallocene compound of Chemical formula 1 and the second metallocene compound of Chemical formula 2. For example, a mixture of the first metallocene compound and the aluminoxane is prepared in which with respect to 1 mole of the first metallocene compound, the amount of aluminum is 1 to 100,000 mole, preferably 1 to 5,000 mole, and then a mixture of the second metallocene compound and the aluminoxane is prepared in which with respect to 1 mole of the second metallocene compound, the amount of aluminum is 1 to 100,000 mole, preferably 1 to 5,000 mole. Then two mixtures are mixed to prepare the olefin polymerization catalyst composition according to the present invention.

The mixture of the catalyst component composition can be made without specific limitations. For example, the first and second metallocene compound and the aluminoxane can be mixed for 5 minutes to 24 hours, preferably 15 minutes to 16 hours simultaneously. Alternatively, the first metallocene compound and the aluminoxane are mixed first for 5 minutes to 10 hours, preferably for 15 minutes to 4 hours to form a first mixture. Then, the second metallocene compound and the aluminoxane are mixed for 5 minutes to 10 hours, preferably for 15 minutes to 4 hours, to form a second mixture. Finally the first mixture and the second mixture are mixed for 5 minutes to 24 hours, preferably for 15 minutes to 16 hours. It is desirable that the compounds should be mixed under an inert atmosphere of nitrogen or argon, without a solvent, or in the presence of an inert hydrocarbon solvent such as heptane, hexane, benzene, toluene, xylene or mixtures thereof. The temperature of the mixing process is 0 to 150° C., preferably 10 to 100° C. The catalyst solution in which the catalyst is uniformly dissolved in the hydrocarbon solvent can be used as it stands, or the catalyst in a solid powder state after the solvent has been removed can be used. The catalyst in a solid powder state can be prepared by carrying out a precipitation reaction of the catalyst solution, and solidifying the precipitate from the reaction.

In the catalyst composition according to the present invention, the first and second metallocene compound and the aluminoxane may be supported by an organic or inorganic carrier. Therefore, the catalyst composition of the present invention can exist in a form supported by an organic or inorganic porous carrier (for example silica, alumina, mixture of silica and alumina, and so on) or a form of an insoluble particle of the carrier, as well as a form of a solid powder or a homogeneous solution. The method for contacting a solution state catalyst with the carrier will be explained, but the present invention is not limited to the following methods. At first, a solution state catalyst is prepared by mixing the first and second metallocene compound and the aluminoxane and then the catalyst prepared is contacted with a porous carrier (for example, a silica carrier having pore sizes of 50 to 500 Å and a pore volume of 0.1 to 5.0 cm$^3$/g) to form a slurry. Next, the mixture of the slurry state is treated with an acoustic wave or oscillating wave having the frequency of 1 to 10,000 kHz, preferably 20 to 500 kHz at 0° C. to 120° C., preferably 0° C. to 80° C. for 0.1 to 6 hours, preferably 0.5 to 3 hours, to deep uniformly infiltrate the catalyst components into the micro pores of the porous carrier. After applying the acoustic wave or the oscillating wave, the method of contacting the catalyst with the carrier may also include the step of washing the supported catalyst with a hydrocarbon selected from the group consisting of pentane, hexane, heptane, isoparaffin, toluene, xylene and mixtures thereof.

As the porous carrier, porous inorganic compounds, inorganic salts, and organic compounds with micro pores and a large surface area can be used without restrictions. The shape of the inorganic (inorganic compounds or inorganic salts) carrier in the porous carrier is not limited if the prescribed shape can be obtained during the preparation process of the supported catalysts, and may be in shape such as powder, particle, flake, foil, fiber, and so on. Regardless of the shape of the inorganic carrier, the maximum length of the inorganic carrier is generally from 5 to 200 μm, preferably from 10 to 100 μm, the preferable surface area of the inorganic carrier is 50 to 1,000 m$^2$/g and the preferable pore volume is 0.05 to 5 cm$^3$/g. Generally, the inorganic carrier should be treated to remove water or hydroxyl group therefrom before the use. The treatment can be carried out by calcining the carrier at 200° C. to 900° C. under an inert atmosphere such as air, nitrogen, argon, or so on. Non-limiting examples of the inorganic salt carrier or the inorganic carrier include silica, alumina, bauxite, zeolite, magnesium chloride (MgCl2), calcium chloride (CaCl2)), magnesium oxide (MgO), zirconium dioxide (ZrO2), titanium dioxide (TiO2), boron trioxide (B2O3), calcium oxide (CaO), zinc oxide (ZnO), barium oxide (BaO), thorium oxide (ThO2) and mixtures thereof such as silica-magnesium oxide (SiO2-MgO), silica-alumina (SiO2-Al2O3), silica-titanium dioxide (SiO2-TiO2), silica-vanadium pentoxide (SiO2-V2O5), silica-chromium trioxide (SiO2-CrO3), silica-titanium dioxide-magnesium oxide (SiO2-TiO2-MgO) or so on. Small amount of carbonate, sulfate, or nitrate can be added to these compounds. Non-limiting examples of the organic compound carrier include starch, cyclodextrin, synthetic polymer or so on. Examples of the solvent, which is used for bringing a solution state catalyst into contact with the porous carrier, include an aliphatic hydrocarbon solvent such as pentane, hexane, heptane, octane, nonane, decane, undecane, dodecane and so on, an aromatic hydrocarbon solvent such as benzene, monochlorobenzene, dichlorobenzene, trichlorobenzene, toluene and so on, a halogenated aliphatic hydrocarbon solvent such as dichloromethane, trichloromethane, dichloroethane, trichloroethane, and so on. When the catalyst for olefin polymerization used the present invention is supported in the carrier, the composition of each component of the catalyst is the same as that of the catalyst in solution or solid state. The carrier amount of aluminum component in the catalyst for olefin polymerization is 5 to 30 weight part, preferably 7 to 20 weight part with respect to 100 weight part of the carrier, and the carrier amount of the transition metal component in the catalyst for olefin polymerization is 0.01 to 2 weight part, preferably 0.05 to 1.5 weight part with respect to 100 weight part of the carrier.

The catalyst composition used in a multimodal polyolefin manufacturing method using a multi-stage continuous polymerization method according to the present invention can exist in a form supported by an organic or inorganic porous carrier or a form of an insoluble particle of the carrier. The conditions for each polymerization reactions can also be varied according to the supported form or the type of carrier, the polymerization method (slurry polymerization, gas phase polymerization), target polymer properties result or the polymer shape.

The amount of the first and second metallocene compound is not limited especially. However, the concentration of the central metal of the first and second metallocene compound is preferably $10^{-8}$ to 10 mol/l, and more preferably $10^{-7}$ to $10^{-2}$ mol/l in a polymerization reaction system.

In the multimodal polyolefin manufacturing method according to the present invention, a pre-polymerization and a main polymerization process may be further included. Specifically, before polymerizing a high molecular weight bimodal polymer in the first reactor, the method may further include a step of undergoing a pre-polymerization process in one or more reactors. For example, the pre-polymerization process is a process in which the catalyst is pre-polymerized, and may include primary polymerization using a small amount of catalyst and a small amount of monomer. If the catalyst is first polymerized in advance, process stability can be increased. It is easy to manufacture bimodal products because a wider range of operating conditions is possible.

It is preferable to use the same catalyst and polymer used in the pre-polymerization process as those used in polymerization in the first reactor and the second reactor. In the pre-polymerization process, the olefin polymer or copolymer is produced in the amount of 0.05 to 500 g, preferably 0.1 to 300 g, and more preferably 0.2 to 100 g with respect to 1 g of the olefin catalyst. Examples of the olefin usable for the pre-polymerization, include α-olefin of 2 to 20 carbon atoms, preferably α-olefin of 4 to 10 carbon atoms, such as ethylene, propylene, 1-butene, 1-pentene, 4-methyl-1-pentene, 1-hexene, 1-octene, 1-decene, 1-dodecene, 1-tetradecene, 3-methyl-1-butene, 3-methyl-1-pentene, and so on.

The multimodal polyolefin polymer produced with the multistage polymerization process according to the present invention includes the high molecular weight bimodal polymer and the low molecular weight bimodal polymer in polymer particles at the same time. Thus, the multimodal polyolefin resin has the characteristics of a broad molecular weight distribution, a super high molecular weight component, and a high complex viscosity at a low shear rate. The finally polymerized multimodal polyolefin satisfies the following properties.

(11) Density (d): 0.930 to 0.965 g/cm³
(12) Melt flow index (MIF, 190° C., 21.6 kg weight condition): 0.1 to 50 g/10 min
(13) Weight average molecular weight (Mw) measured with Gel-permeation chromatography (GPC): 100,000 to 600,000 g/mol
(14) Ratio of weight average molecular weight (Mw) to number average molecular weight (Mn) (Mw/Mn, Molecular weight distribution (MWD)) measured with Gel-permeation chromatography (GPC): 10 to 60

In producing the multimodal polyolefin polymer with the cascade polymerization process according to the present invention, the bimodal polymer having relatively high molecular weight and high density is produced in the first reactor. Namely, as the more rigid polymer particles are produced in the first reactor, when the bimodal polymer having relatively low molecular weight is produced in the second reactor, the overall polymerization process can be carried out more stably.

The method of the present invention is more effective in controlling the properties of polyolefin resin compared with the conventional polyolefin resin polymerization method of using one reactor and two catalysts. Namely, by producing multimodal polyolefin with the continuous polymerization method, the super high molecular weight component, a matrix component and the low molecular weight component of the multimodal polyolefin are effectively controlled according to the desired properties of polyolefin resin. The super high molecular weight component means a component having the weight average molecular weight (Mw) of more than 5,000,000 g/mol, and the matrix component means a component having the weight average molecular weight (Mw) of 20,000 to 200,000 g/mol, and the low molecular weight component means a component having the weight average molecular weight (Mw) of less than 20,000 g/mol.

The multimodal polyolefin polymer produced with the cascade polymerization process shows total 4 peaks since the high molecular weight bimodal polymer and the low molecular weight bimodal polymer are uniformly distributed in each polymer particle. However, in molecular weight distribution by gel-permeation chromatography (GPC), the left peak of the high molecular weight bimodal polymer and the left peak of the low molecular weight bimodal polymer can be closely located, and the right peak of the high molecular weight bimodal polymer and the right peak of the low molecular weight bimodal polymer can be closely located. In this case, outwardly, total 2 peaks may be shown in molecular weight distribution by gel-permeation chromatography (GPC).

In the prior multistage polymerization reaction using Ziegler-Natta catalyst and metallocene catalyst, a low molecular weight polymer was produced in a first reactor, and continuously, a high molecular weight polymer was produced in a second reactor to produce multimodal polyolefin. In contrast, in the cascade polymerization process according to the present invention, the high molecular weight bimodal polymer is produced in the first reactor, and continuously, the low molecular weight bimodal polymer is produced in the second reactor to produce multimodal polyolefin. Thus, according to the present invention, the process stability can be improved, and total 4 polyolefins having different molecular weight distributions are uniformly distributed in each polymer particle.

When producing bimodal polyolefin in a single reactor using two or more different metallocene catalysts, molecular weight distributions of the low molecular weight peak and the high molecular weight peak of GPC graph are very narrow. This is because the molecular weight distribution of the polymer produced with metallocene catalyst is narrow. In this case, the matrix component is insufficient, the high molecular weight component and the low molecular weight component cannot be smoothly dispersed or distributed. Thus, when high shear energy is applied to the polymer in processing the polymer, the high molecular weight component and the low molecular weight component can be separated.

In contrast, when the high molecular weight bimodal polymer and the low molecular weight bimodal polymer are continuously polymerized to produce polyolefin in multistage process, the left peak of the high molecular weight bimodal polymer and the left peak of the high molecular weight bimodal polymer are merged to one peak, and also the right peak of the high molecular weight bimodal polymer and the right peak of the high molecular weight bimodal polymer are merged to one peak. Thus, the molecular weight distributions of each peaks become wider, and the matrix component increases. Thus, in final product, the high molecular weight component and the low molecular weight component are smoothly dispersed or distributed, and the processability of the final product is improved.

The present invention also provides a polyolefin copolymer prepared by the present polymerizing method and a molded product containing the polyolefin copolymer. The Examples of the molded product include a blow molded product, an inflation molded product, a cast molded product, an extrusion lamination molded product, an extrusion molded product, a foam molded product, an injection molded product, sheets, films, fibers, monofilaments, nonwoven fabric and pipes etc.

Hereinafter, examples of the present invention are provided for better understanding of the present invention. The following examples are exemplary and the present invention is not limited by the examples.

In the following Preparation Examples, Examples, Comparative Examples and Reference Examples, the catalyst was prepared by a Schlenk technique in which air and moisture are completely blocked. Specifically, the treatment and manipulation of air-sensitive reagents and materials was performed using a Schlenk line, or in a glovebox filled with nitrogen. Reagents were typically purchased from Sigma-Aldrich Chemical Company, used without extra purification, and purified dry nitrogen as an inert gas. Zirconium (IV) chloride (99.5%) and normal butyl lithium were purchased from Boulder Scientific and Aldrich Chemical Company and used as such. Bis[isobutylcyclopentadienyl]Zirconium dichloride and bis[normal-butylcyclopentadienyl] Zirconium dichloride were commercially purchased from Chemtura and so on. All solvents also were dried using sodium metal and calcium hydride in an inert nitrogen atmosphere. In the Examples, Comparative Examples and Reference Examples of the present specification, the measurement method of each property is as follows:

(1) Density: measured by ASTM 1505 and ASTM D 1928
(2) Melt Index (MIE, 2.16 kg/10 min): measured by ASTM D1238 at 190° C.
(3) Medium Load Melt Index (MIP, 5.0 kg/10분): measured by ASTM D1238 at 190° C.
(4) High Load Melt Index (MIP, 21.6 kg/10분): measured by ASTM D 1238 at 190° C.
(5) Melt Index Ratio (SR): MIF/MIE, MIF/MIP
(6) molecular weight and molecular weight distribution (polydispersity): It was measured by following to use a gel permeation chromatography (GPC, Polymer Laboratory Inc. 220 system). As a separation column using 2 Olexis and 1 Guard, the column temperature was maintained at 160° C. The calibration was carried out by using a standard polystyrene set from Polymer Laboratory Inc., and trichlorobenzene containing 0.0125 wt % of BHT (antioxidant) was used as the eluent.]

Samples were prepared at a ratio of 0.1 to 1 mg/ml, the injection amount was 0.2 ml, the injection time was 30 minutes, and the pump flow rate was maintained at 1.0 ml/min, and measured for 30 to 60 minutes. Using Easical A and Easical B (manufactured by Agilent), polystyrene standards, universal was calibrated, followed by conversion to polyethylene, number average molecular weight (Mn), weight average molecular weight (Mw), and z average molecular weight (Mz) were measured. The molecular weight distribution (Mw/Mn) are indicated the ratio of weight average molecular weight and number average molecular weight.

[Preparation Example 1] Preparation of Catalyst

In a nitrogen atmosphere, bis(isobutylcyclopentadienyl) Zirconium dichloride ((iBuCp) 2ZrCl2) as the first metallocene compound (component 1), diphenylmethylidene(n-Butylcyclopentadienyl)(2,7-di-tert-butylfluoren-9-yl) Zirconium dichloride (Ph2C(2,7-t-BuFlu))(nBu-Cp)ZrCl2 as the second metallocene compound (component 2) and methylaluminoxane (MAO, Albemarle, 10% toluene solution) was mixed in a 150 L reactor, and stirred at 60° C. for 60 minutes to prepare a catalyst solution. The plasticized silica (SiO2) at 250° C. was added to the solution, after ultrasonication was applied for 1 hour, the supernatant was removed, ultrasonication was applied for 1 hour, followed by the supernatant was removed. Next, the remaining solid particles were washed twice with hexane, then dried for vacuum, and prepared a supported catalyst of free flowing solid powder.

[Example 1 to 2] Multimodal Polyolefin Resin

It was carried out in two gas-phase polymerization reactors generally well-known capable of continuous polymerization. Prepolymerization was carried out using the supported hybrid metallocene catalyst obtained from Preparation Example 1, and the prepolymerized catalyst was continuously put into the first reactor. In the first reactor, relatively little hydrogen was used, and high-density polyethylene with high molecular weight was prepared by using no comonomer. It was continuously put into a second reactor and prepared a low density polyethylene with a relatively low molecular weight compared to a polymer polymerized in the first reactor using a relatively large amount of hydrogen and comonomer. The comonomer was used 1-hexene, and polyethylene was continuously obtained by adjusting to the conditions in Table 1 below.

1000 ppm of primary antioxidant (Ethanox 330, Albermal), 3000 ppm of primary and secondary antioxidant blend products (S12B, Songwon Industry) and 1500 ppm of processing material (Zn-St, Songwon Industry) were added to the obtained polyethylene copolymer, and granulated at an extrusion temperature of 170 to 210° C. using a twin-screw extruder. Raw material properties and product properties (weight average molecular weight/1000) of polyethylene polymers, melt index (MIE, MIF), melt flow index ratio (SR (MIF/MIE, MIF/MIP)) and Density was evaluated in accordance with the property evaluation method described above and the results are presented in Table 2 below.

[Comparative Example 1 to 2] Polyolefin Resin

Using the well-known HDPE product (commercial name P600) of Korea Petrochemical Ind. Co., LTD (KPIC), comparative Example 1 was prepared using a Z/N (Ziegler-Natta) catalyst in a continuous reactor. The results of comparison with various properties of Examples 1 to 2 are presented in Table 2 below.

Comparative Example 2 was a polyethylene polymer prepared to have a melt viscosity and bimodality similar to those of Examples 1 to 2 in a single reactor using the catalyst obtained in Preparation Example 1. The results of comparison with various properties of Examples 1 to 2 are presented in Table 2 below.

TABLE 1

| Polymerization conditions | Example 1 | | Example 2 | |
|---|---|---|---|---|
| | reactor | | | |
| | The first 1reactor | The second reactor | The first 1reactor | The second reactor |
| polymerization temperature(° C.) | 75 | 70 | 78 | 73 |
| Ethylene Mol % | 15.0 | 30.0 | 12.0 | 20.0 |
| 1-hexene mol % | 0.00 | 0.05 | 0.00 | 0.05 |
| Hydrogen (g/ton C2) | 80 | 180 | 85 | 190 |
| Run time(min.) | 120 | 120 | 120 | 120 |

TABLE 2

| Polymerization conditions | Comparative Example 1 | Comparative Example 2 Single reactor | Example 1 | | Example 2 | |
|---|---|---|---|---|---|---|
| | | | reactor | | | |
| | | | The first reactor | The second reactor | The first reactor | The second reactor |
| MIE2.16 kg(dg/min) | 0.047 | 0.063 | 0.014 | 0.080 | 0.008 | 0.06 |
| MIP5.0 kg(dg/min) | 0.213 | 0.248 | 0.080 | 0.350 | 0.050 | 0.270 |
| MIF21.6 kg(dg/min) | 6.296 | 8.134 | 3.1 | 14.7 | 1.8 | 13.3 |
| SR(MIF/MIE) | 135.4 | 129.1 | 219.3 | 183.8 | 220.0 | 221.7 |
| SR(MIF/MIP) | 29.6 | 32.8 | 38.4 | 42.0 | 35.2 | 49.3 |
| Density(g/cc) | 0.9481 | 0.9473 | 0.9540 | 0.9521 | 0.9533 | 0.9517 |
| Mw(10^3 g/mol) | 283 | 206 | 407 | 268 | 410 | 285 |
| Mz(10^3 g/mol) | 1,498 | 965 | 2,054 | 1,478 | 1,890 | 1,626 |
| MWD(Mw/Mn) | 24.63 | 10.77 | 14.15 | 14.22 | 13.57 | 16.12 |
| MWD(Mz/Mw) | 5.29 | 4.68 | 5.05 | 5.51 | 4.61 | 5.71 |
| LMW Fraction (%) | 61.3 | 67.6 | 65.2 | 68.3 | 62.0 | 64.2 |
| η0 10^8 (190° C.) mPa · s | 6.26 | 1.50 | ND (Measurement impossible) | 4.82 | ND (Measurement impossible) | 5.00 |

Comparative Example 1 was provided a bimodal product in a continuous reactor using a Ziegler-Natta catalyst, it was included a wide molecular weight distribution and a high ultra-high molecular weight range compared to a product using a metallocene catalyst, due to this effect, the composite viscosity at low strain rate was very high. As in Comparative Example 2, the polymers of Examples 1 to 2 were simultaneously presented bimodal polymers with high molecular weight and bimodal polymers with low molecular weight in one polymer particle, compared to bimodal products using metallocene catalyst in a single reactor. The polymers of Examples 1 to 2 provided with improved processability and properties, since a wide molecular weight distribution, a high ultra-high molecular range, a high composite viscosity at a low strain and so on.

Figure 2:
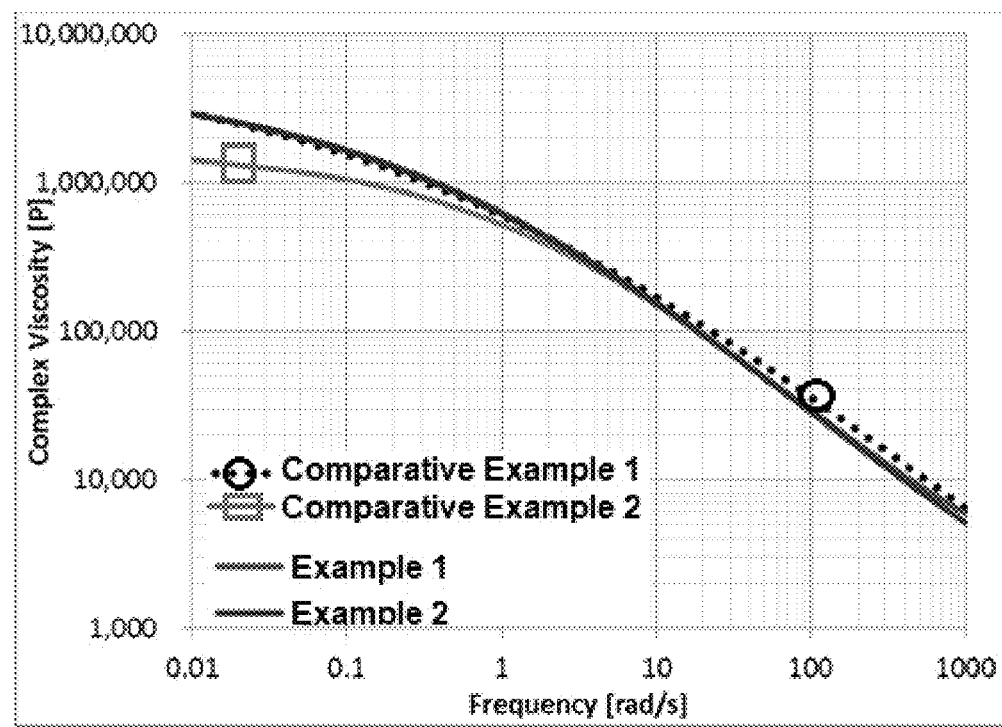
FIG. 2 shows melt strength analysis diagram according to the examples of the present invention and comparative examples.

FIG. 1 shows the gel permeation chromatography molecular weight distribution of Examples 1 to 2, FIG. 2 shows the melt strength analysis graph of Examples 1 to 2. As shown in FIG. 1 below, it confirmed the ultra-high molecular range (Mw>5,000,000) of the comparative example 1 and Example 1 to 2 on the GPC were similar. As shown in FIG. 2, the Examples 1 to 2 were presented a composite viscosity value at a low strain similar to Comparative Example 1. On the other hand, the high strain presented a lower composite viscosity value than Comparative Example 1, which could be expected to have a lower viscosity than in the environment of the extruder with high strain conditions during extrusion. Through this, it was an element that could expect excellent extrusion amount, motor load and so on.

As shown in Table 2, the melt index (MIP5.0 kg (dg/min)) of Examples 1 to 2 is higher than Comparative Example 2 but, as shown in FIG. 1 below, on the GPC graph, compared to Comparative Example 2 It can be seen that there are much ultra-high molecular ranges (Mw>5,000,000) of Examples 1 to 2. Also, as shown in FIG. 2, it confirmed that the composite viscosity value at a low strain rate is higher than Comparative Example 2. It was easy to process because Examples 1 to 2 were presented a higher melt index and flowability than Comparative Example 2, but, since it was contained more ultra-high molecular weight, it had the advantage of increasing the mechanical properties of the product. In addition, it was possible to increase processing stability when forming large-diameter pipes and films since the composite viscosity value at a low strain rate in FIG. 2 is higher than that of Comparative Example 2.

The multimodal polyolefin producing method using a multi-step continuous polymerization method (Cascade) using a bimodal catalyst provided by the present invention could be prepared in various ways by slightly changing the operating conditions without changing the catalyst in accordance with the processing type and product type. Since it was prepared a relatively high molecular weight and high density bimodal polymer in the first reactor to increase process stability, it was provided harder polymer particles, thereby providing a relatively low molecular weight bimodal polymer in the second reactor, more stable operation was possible.

[Reference Example 1 to 7] Pilot Evaluation of Catalyst Prepared in Preparation Example 1

Pre-polymerization was performed using the hybrid supported metallocene catalyst obtained from Preparation Example 1, and the pre-polymerized catalyst was continuously put into a gas phase pilot reactor. 1-hexene was used as a comonomer, and polyethylene was continuously obtained by adjusting to the conditions in Table 3 below. The product properties (Mw/1000 (weight average molecular weight/1000), melt index (MIE, MIF), melt flow index ratio (SR (MIF/MIE, MIF/MIP)) and density of the polyethylene polymer were evaluated in accordance with the above-mentioned property evaluation methods and the results are presented in Table 4 below.

TABLE 3

| Polymerization conditions | Reference example 1 | Reference example 2 | Reference example 3 | Reference example 4 | Reference example 5 | Reference example 6 | Reference example 7 |
|---|---|---|---|---|---|---|---|
| polymerization temperature (° C.) | 71 | 71 | 68 | 71 | 76 | 80 | 80 |
| Ethylene Mol % | 15.0 | 15.0 | 15.5 | 14.0 | 14.5 | 14.8 | 14.0 |
| 1-Hexene Mol % | 0.01 | 0.01 | 0.01 | 0.05 | 0.05 | 0.05 | 0.01 |
| Hydrogen (g/ton C2) | 50 | 235 | 300 | 385 | 480 | 950 | 1,100 |
| Run time (min.) | 120 | 120 | 120 | 120 | 120 | 120 | 120 |
| catalyst active (gPE/gCat-hr) | 1,160 | 1,310 | 1,250 | 1,330 | 1,380 | 1,715 | 1,425 |

TABLE 4

| polymer analysis | Reference example 1 | Reference example 2 | Reference example 3 | Reference example 4 | Reference example 5 | Reference example 6 | Reference example 7 |
|---|---|---|---|---|---|---|---|
| MIE2.16 kg (dg/min) | — | — | — | 0.61 | 0.26 | 0.56 | 0.55 |
| MIP5.0 kg (dg/min) | 0.006 | 0.036 | 0.250 | — | — | — | — |
| MIF21.6 kg (dg/min) | 0.2 | 0.7 | 6.3 | 79.5 | 25.2 | 24.5 | 19.3 |
| SR (MIF/MIE) | — | — | — | 130.0 | 96.9 | 43.8 | 35.1 |
| SR (MIF/MIP) | 33.3 | 19.7 | 25.2 | — | — | — | — |
| Density (g/cc) | 0.9448 | 0.9514 | 0.9525 | 0.9517 | 0.9483 | 0.9475 | 0.9524 |
| Mw 10^3 g/mol | 685 | 432 | 240 | 133 | 171 | 132 | 149 |
| Mz 10^3 g/mol | 2,465 | 1,709 | 995 | 615 | 776 | 428 | 468 |
| MWD Mw/Mn | 10.89 | 18.20 | 17.70 | 15.46 | 17.82 | 18.31 | 17.83 |
| MWD Mz/Mw | 3.60 | 3.95 | 4.15 | 4.62 | 4.54 | 3.24 | 3.14 |
| LMW fraction % | 51.3 | 42.6 | 55.4 | 66.3 | 55.7 | 40.1 | 26.0 |
| Micro particle, 50 μm or less (Fines, %) | 0.4 | 1.2 | 2.5 | 3.5 | 5.4 | 6.8 | 9.7 |

As shown in Tables 3 to 4, Reference Examples 1 to 3 were prepared for high molecular weight bimodal polymers and Reference Examples 4 to 7 were prepared for low molecular weight bimodal polymers. In the above experiment, it could be seen that as the hydrogen injection amount increased, the molecular weight decreased and the content of the fine particles (50 μm or less) increased. As such, depending on the amount of hydrogen injection, it could be confirmed that the polymer particles became unstable, and due to the increase in static electricity and the decrease in polymerization heat exchange by the increased microparticles, troubles might occur during the polymerization process.

Thereby, when the catalyst particles were not sufficiently grown in the first reactor and hydrogen was increased to produce a low molecular weight bimodal, there was a high possibility of trouble during polymerization. It was much more advantageous in terms of microparticles and process stability to prepare a low molecular weight bimodal by increasing hydrogen in the second reactor after the catalyst particles were sufficiently grown by preparing a high molecular weight bimodal in the first reactor.

However, in Reference Examples 1 to 7, when one catalyst was used and different polymerization conditions were applied, it was found that various molecular weights and molecular weight distributions, bimodality, and ultra-high molecular weight ranges etc., can be adjusted as desired. As an example, in the reference example 1, relatively low hydrogen was injected to generate an ultra-high molecular range, and thus it might be effective to increase zero shear viscosity, which was essential for processing large diameter pipes and large films. The reference example 4 might provide a polymer that is effective in processability due to its high low molecular weight.

[Reference Example 8 to 15] Evaluation of Blends of Polymers of Reference Examples 1 to 7

The high molecular weight polymers obtained from Reference Examples 1 to 3 and the low molecular weight polymers obtained from Reference Examples 4 to 7 were blended using an extruder at the ratios presented in Table 5 below. During the mixing, 1000 ppm of the primary antioxidant (Ethanox 330, Albermal), 3000 ppm of the primary and secondary antioxidant blend products (S12B, Songwon Industry) and 1500 ppm of the processing material (Zn-St, Songwon Industry) were added and granulated at an extrusion temperature of 170 to 220° C. using a twin screw extruder. The product properties (Mw/1000 (weight average molecular weight/1000), melt index (MIE, MIF), melt flow index ratio (SR (MIF/MIE, MIF/MIP)) and density of the blended polyethylene polymer were evaluated in accordance with the above-mentioned property evaluation methods and the results are presented in Table 5, FIG. 3 (GPC analysis comparison) and FIG. 4 (Rheology analysis comparison) below.

But, the method described above was passively mixed in accordance with the ratio of the high-molecular bimodal polymer and the low-molecular bimodal polymer, so that the process was relatively complicated, and there was a disadvantage of increasing cost. However, by the multi-stage polymerization reaction in accordance with the present invention, since the ratio of the polymers polymerized in the first reactor and the second reactor can be more easily controlled, it is possible to form a multimodal polyolefin resin having desired physical properties.

The invention claimed is:

1. A method for producing multimodal polyolefin using multistage polymerization process, comprising the steps of:

TABLE 5

| section | Comparative Example 1 | Reference example 8 | Reference example 9 | Reference example 10 | Reference example 11 | Reference example 12 | Reference example 13 | Reference example 14 | Reference example 15 |
| --- | --- | --- | --- | --- | --- | --- | --- | --- | --- |
| Blend type | P600 | Example 1/ Example 4 | Example 2/ Example 4 | Example 1/ Example 4 | Example 1/ Example 5 | Example 2/ Example 5 | Example3/ Example 6 | Example 4/ Example 7 | Example3/ Example 5 |
| blend ratio | — | 50/50 | 50/50 | 40/60 | 40/60 | 40/60 | 40/60 | 40/60 | 40/60 |
| MIE2.16 kg (dg/min) | 0.047 | 0.013 | 0.040 | 0.0295 | 0.019 | 0.068 | 0.098 | 0.618 | 0.137 |
| MIP5.0 kg (dg/min) | 0.213 | 0.068 | 0.168 | 0.156 | 0.102 | 0.285 | 0.36 | 2.053 | 0.53 |
| MIF21.6 kg (dg/min) | 6.296 | 2.833 | 4.887 | 5.329 | 2.984 | 5.973 | 7.02 | 39.1 | 12.24 |
| SR (MIF/MIE) | 135.4 | 226.7 | 123.7 | 180.6 | 157.1 | 87.8 | 71.6 | 63.3 | 89.3 |
| SR (MIF/MIP) | 29.6 | 41.7 | 29.2 | 34.2 | 29.4 | 21.0 | 19.5 | 19.0 | 23.1 |
| Density (g/cc) | 0.9481 | 0.9492 | 0.9509 | 0.949 | 0.9486 | 0.9507 | 0.9505 | 0.9511 | 0.9505 |
| Mw 10^3 g/mol | 283 | 407 | 316 | 350 | 371 | 258 | 217 | 138 | 213 |
| Mz 10^3 g/mol | 1,498 | 2,246 | 1,552 | 2,302 | 2,164 | 1,404 | 955 | 555 | 1,083 |
| MWD Mw/Mn | 24.63 | 25.84 | 27.32 | 26.70 | 28.57 | 30.18 | 24.54 | 19.44 | 25.36 |
| MWD Mz/Mw | 5.29 | 5.52 | 4.91 | 6.58 | 5.83 | 5.44 | 4.40 | 4.02 | 5.08 |
| LMW Fraction % | 61.3 | 64.0 | 54.3 | 81.1 | 41.6 | 48.6 | 50.7 | 56.9 | 53.0 |
| η0 10^8 (190° C.) mPa · s | 6.26 | 22.30 | 4.48 | 18.19 | 28.28 | 3.70 | 2.02 | 0.28 | 1.59 |

Figure 3:
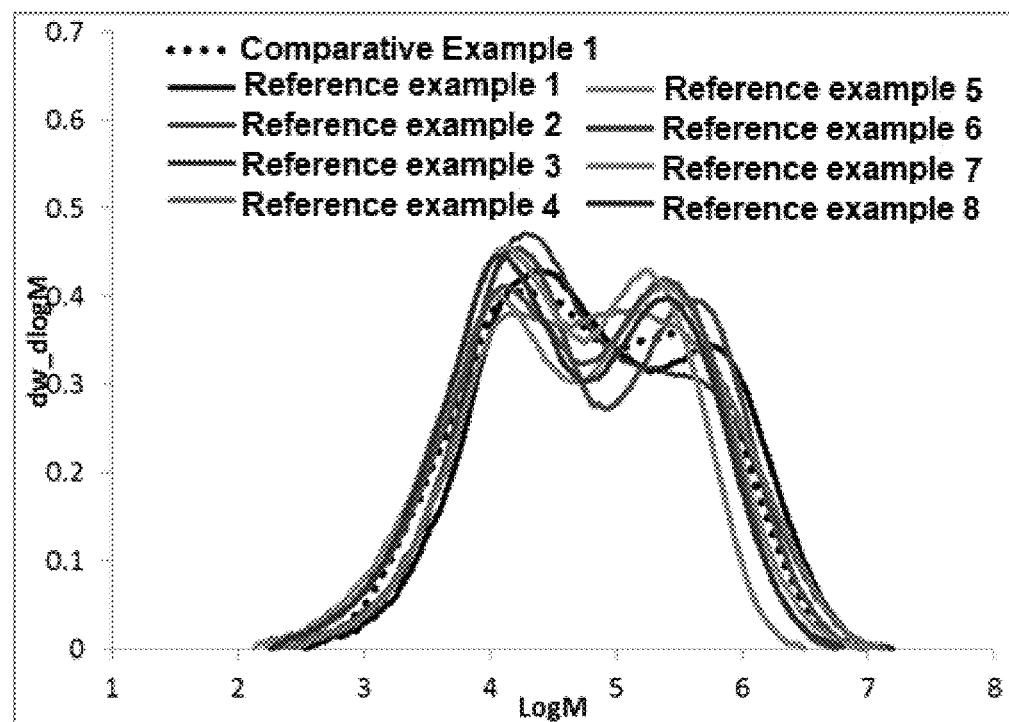
FIG. 3 shows molecular weight distributions by gel-permeation chromatography according to the reference examples of the present invention.
Figure 4:
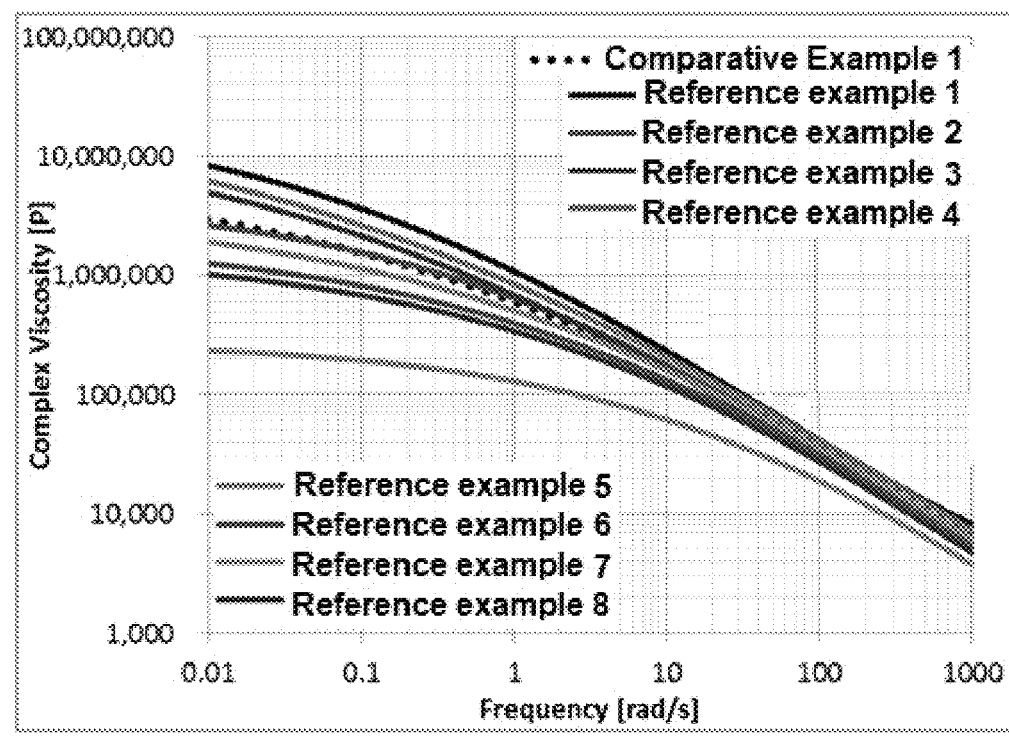
FIG. 4 shows melt strength analysis diagram according to the reference examples of the present invention.

In the Reference Examples 8 to 15, a product having desired physical properties and processability could be prepared through a combination of a bimodal polymer having a relatively high molecular weight and a bimodal polymer having a relatively low molecular weight. For example, when comparing the results of GPC analysis with polymer of Comparative Example 1 for commercially well-known large-diameter pipes and FIG. 2, Examples 8 to 11 included more ultra-high molecular ranges than Comparative Example 1. As shown in FIG. 3, in the low shear rate range, the complex viscosity of Example 8, 10, and 11 has a higher value than Comparative Example 1. Polymers obtained a high composite viscosity at such a low strain might be more advantageous in physical properties and processability in processing large diameter pipes and large diameter films. Also, as in Example 12 to 15, compared to Comparative Example 1, polymers with a small area of ultra-high molecular weight and a relatively high melt index might be more advantageous in small and medium-sized pipes, small and medium-sized film, small blow molding and injection products, where processing speed were more important.

polymerizing a high molecular weight bimodal polymer by introducing a monomer in the presence of a catalyst composition including two or more different catalysts in a first reactor; and continuously introducing the high molecular weight bimodal polymer produced in the first reactor into a second reactor, and polymerizing a low molecular weight bimodal polymer by introducing a monomer in the presence of the catalyst composition, wherein the multimodal polyolefin includes the high molecular weight bimodal polymer and the low molecular weight bimodal polymer at the same time, and wherein the high molecular weight bimodal polymer has a weight average molecular weight (Mw) measured with Gel-permeation chromatography (GPC) of equal to or more than 200,000 g/mol, and the low molecular weight bimodal polymer has a weight average molecular weight (Mw) measured with Gel-permeation chromatography (GPC) of less than 200,000 g/mol.

2. The method for producing multimodal polyolefin according to claim 1, wherein the high molecular weight bimodal polymer satisfies the following properties:

(1) Density(d): 0.930 to 0.965 g/cm$^3$
(2) Melt flow index (MIF, 190° C., 21.6 kg weight condition): 0.01 to 20 g/10 min
(3) Ratio of weight average molecular weight (Mw) to number average molecular weight (Mn) (Mw/Mn, Molecular weight distribution (MWD)) measured with Gel-permeation chromatography (GPC): 5 to 50
(4) Two or more peaks are shown when molecular weight is measured with Gel-permeation chromatography (GPC), the low molecular weight bimodal polymer satisfies the following properties:
(5) Density(d): 0.910 to 0.965 g/cm$^3$
(6) Melt flow index (MIF, 190° C., 21.6 kg weight condition): 10 to 200 g/10 min
(7) Ratio of weight average molecular weight (Mw) to number average molecular weight (Mn) (Mw/Mn, Molecular weight distribution (MWD)) measured with Gel-permeation chromatography (GPC): 5 to 50
(8) Two or more peaks are shown when molecular weight is measured with Gel-permeation chromatography (GPC), and the multimodal polyolefin satisfies the following properties:
(9) Density(d): 0.930 to 0.965 g/cm$^3$
(10) Melt flow index (MIF, 190° C., 21.6 kg weight condition): 0.1 to 50 g/10 min
(11) Weight average molecular weight (Mw) measured with Gel-permeation chromatography (GPC): 100,000 to 600,000 g/mol
(12) Ratio of weight average molecular weight (Mw) to number average molecular weight (Mn) (Mw/Mn, Molecular weight distribution (MWD)) measured with Gel-permeation chromatography (GPC): 10 to 60.

3. The method for producing multimodal polyolefin according to claim 1, wherein a polymerization temperature of the first reactor is higher than that of the second reactor.

4. The method for producing multimodal polyolefin according to claim 1, wherein a difference between polymerization temperatures of the first reactor and the second reactor is 1 to 20° C.

5. The method for producing multimodal polyolefin according to claim 1, wherein a hydrogen (H$_2$) concentration in the first reactor is 0 to 300 g/ton C2, and the hydrogen (H$_2$) concentration in the second reactor is 300 to 2,000 g/ton C2.

6. The method for producing multimodal polyolefin according to claim 1, wherein before polymerizing a high molecular weight bimodal polymer in the first reactor, the method further includes a step of undergoing a pre-polymerization process in one or more reactors.

7. The method for producing multimodal polyolefin according to claim 1, wherein both of the first reactor and the second reactor are slurry phase reactors or gas phase reactors.

8. The method for producing multimodal polyolefin according to claim 1, wherein the first reactor and the second reactor includes a slurry phase reactor and a gas phase reactor.

9. The method for producing multimodal polyolefin according to claim 1, wherein the reactors are more than two reactors.

10. The method for producing multimodal polyolefin according to claim 1, wherein the monomer is selected from the group consisting of ethylene, propylene and mixture thereof, and optionally further includes α-olefin of 4 to 10 carbon atoms, and the amount of the α-olefin is 0.01 to 10.0 weight % with respect to the total polyolefin of 100 weight %.

11. The method for producing multimodal polyolefin according to claim 1, wherein in producing the low molecular weight bimodal polymer, one or more comonomer is introduced into the second reactor, and the amount of the comonomer is 0.01 to 30 weight % with respect to the total polyolefin of 100 weight %.

12. The method for producing multimodal polyolefin according to claim 1, wherein the catalyst composition includes two or more metallocene catalysts for producing polymers of different molecular weights and one or more cocatalyst.

13. The method for producing multimodal polyolefin according to claim 12, wherein the catalyst composition comprises:
(1) at least one first metallocene compound represented by Chemical formula 1 below;
(2) at least one second metallocene compound represented by Chemical formula 2 below; and
(3) One or more co-catalyst selected from the group of consisting of aluminoxane represented by Chemical formula 3, 4 and 5 below;

(L1)(L2)(X1)(X2)M1  [Chemical formula 1]

In Chemical formula 1, M1 is Titanium(Ti), Zirconium (Zr) or Hafnium(Hf); (L1) and (L2) are independently, a cyclopentadienyl group having hydrocarbyl substituents groups of 3 to 10 carbon atoms containing at least one secondary or tertiary carbon; (X1) and (X2) are independently F, Cl, Br, I or a hydrocarbyl group of 1 to 10 carbon atoms;

(L3-Q-L4)(X1)(X2)M2  [Chemical formula 2]

In Chemical formula 2, M2 is Titanium(Ti), Zirconium (Zr) or Hafnium(Hf); (L3) is fluorenyl group having two or more hydrocarbyl substituent groups of 4 to 10 carbon atoms containing the tertiary carbon; (L4) is a cyclopentadienyl group having at least one hydrocarbyl substituent groups of 4 to 10 carbon atoms; (Q) is a crosslinking functional group represented by Chemical formula Q1R1R2, Q1 is carbon atom(C), silicon atom (Si) or germanium atom(Ge), R1 and R2 are independently hydrogen or a hydrocarbyl group of 1 to 10 carbon atoms; (X1) and (X2) are independently F, Cl, Br, I or a hydrocarbyl group of 1 to 10 carbon atoms;

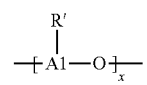

[Chemical formula 3]

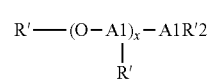

[Chemical formula 4]

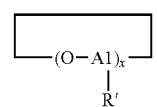

[Chemical formula 5]

In Chemical formula 3, 4 and 5, R is hydrocarbyl group, x is an integer of 1 to 70, y is an integer of 3 to 50.

14. The method for producing multimodal polyolefin according to claim 12, wherein the catalyst composition is supported on an organic or inorganic carrier.

15. The method for producing multimodal polyolefin according to claim 14, wherein the amount of aluminum component in the catalyst composition is 5 to 30 weight part with respect to 100 weight part of the carrier, and the amount of the transition metal component in the catalyst is 0.01 to 2 weight part with respect to 100 weight part of the carrier.

* * * * *